(12) United States Patent
Weinelt et al.

(10) Patent No.: US 12,180,394 B2
(45) Date of Patent: Dec. 31, 2024

(54) MICHAEL-ADDITION-HARDENING HYBRID SYSTEM FOR CHEMICAL FIXING TECHNOLOGY

(71) Applicant: fischerwerke Gmbh & Co. KG, Waldachtal (DE)

(72) Inventors: Christian Weinelt, Teningen (DE); Martin Vogel, Waldkirch (DE); Ursula Link-Pfaff, Emmendingen (DE); Hannah Gehring, Waldkirch (DE)

(73) Assignee: fischerwerke Gmbh & Co. KG, Waldachtal (DE)

( * ) Notice: Subject to any disclaimer, the term of this patent is extended or adjusted under 35 U.S.C. 154(b) by 230 days.

(21) Appl. No.: 17/780,985

(22) PCT Filed: Dec. 1, 2020

(86) PCT No.: PCT/EP2020/084010
§ 371 (c)(1),
(2) Date: May 29, 2022

(87) PCT Pub. No.: WO2021/110621
PCT Pub. Date: Jun. 10, 2021

(65) Prior Publication Data
US 2023/0002653 A1     Jan. 5, 2023

(30) Foreign Application Priority Data

Dec. 4, 2019   (DE) .................. 10 2019 133 060.2
Nov. 2, 2020   (DE) .................. 10 2020 128 713.5

(51) Int. Cl.
*C09J 179/02*   (2006.01)
*C09D 179/02*   (2006.01)
*F16B 13/14*    (2006.01)

(52) U.S. Cl.
CPC .......... *C09J 179/02* (2013.01); *C09D 179/02* (2013.01); *F16B 13/142* (2013.01)

(58) Field of Classification Search
CPC .................................................. C09J 179/02
See application file for complete search history.

(56) References Cited

U.S. PATENT DOCUMENTS

| 5,242,978 A    | 9/1993  | Schaefer et al. |
| 5,677,379 A *  | 10/1997 | Becker ................ C08G 59/686 |
|                |         | 523/411 |
| 2009/0286919 A1 | 11/2009 | Moeller et al. |
| 2017/0313907 A1 | 11/2017 | Cotsakis et al. |
| 2018/0134913 A1 | 5/2018  | De Wolf et al. |

FOREIGN PATENT DOCUMENTS

| DE | 4034279 A1       | 4/1992  |                   |
| DE | 4111828 A1       | 10/1992 |                   |
| DE | 102015003221 A1 *| 10/2015 | ............ C04B 26/06 |
| EP | 1462501 A1 *     | 9/2004  | .......... C09D 175/16 |
| EP | 1647588 A2       | 4/2006  |                   |
| EP | 1 970 408 A1     | 9/2008  |                   |
| EP | 1970480 A1       | 9/2008  |                   |
| EP | 2357162 A1       | 8/2011  |                   |
| EP | 3345978 A1       | 7/2018  |                   |
| JP | H03243643 A      | 10/1991 |                   |

OTHER PUBLICATIONS

International Preliminary Report on Patentability and Written Opinion corresponding to Application No. PCT/EP2020/084010 mailed May 17, 2022.
International Search Report for corresponding Application No. PCT/EP2020/084010, mailed Feb. 12, 2021.
Written Opinion for corresponding Application No. PCT/EP2020/084010, mailed Feb. 12, 2021.
Search Report for corresponding German Application No. 10 2019 133 061.0, dated May 28, 2020.

* cited by examiner

*Primary Examiner* — Daniel McNally
(74) *Attorney, Agent, or Firm* — Renner, Otto, Boisselle & Sklar, LLP

(57) ABSTRACT

A hybrid system for use as an adhesive, coating or paint, wherein the hybrid system includes a) a reaction resin based on α,β-unsaturated compounds, b) a reaction resin based on compounds that include CH-acidic methylene groups, and c) a primary amine, and to related subject matter.

19 Claims, No Drawings

MICHAEL-ADDITION-HARDENING HYBRID SYSTEM FOR CHEMICAL FIXING TECHNOLOGY

TECHNICAL FIELD

The invention relates to a hybrid system (also referred to hereinbelow as a hybrid resin system or hybrid adhesive) for chemical fixing technology, especially for fixing anchoring means in drilled holes, which system includes a reaction resin based on α,β-unsaturated compounds, a reaction resin based on compounds that include CH-acidic methylene groups, and a polyamine, and to the use thereof and to further aspects (embodiments) of the invention mentioned hereinbelow.

DISCUSSION OF THE RELATED ART

In the field of chemical fixing technology, primarily two different systems have become established: a system based on free-radical-polymerisable, ethylenically unsaturated compounds, which is hardened by means of peroxides, and a system based on epoxy/amine. Both systems have advantages and disadvantages. Free-radical-hardening systems are distinguished by rapid low-temperature hardening (for example: −10° C.), but exhibit relatively high shrinkage and not very high pull-out values. On the other hand, epoxy/amine-based systems have a significantly slower hardening speed at low temperatures (for example: <+5° C.), but they exhibit considerably less shrinkage and significantly higher pull-out values.

Efforts have long been made to combine the advantages of both systems in the field of chemical fixing technology. For that purpose, dual-hardening binders have been proposed in the past which cure both by free-radical polymerisation and by polyaddition (epoxy+amine). This means that such hybrid systems are based on resin compositions that contain compounds which are hardenable by two different types of reaction. For example, EP 2 357 162 A1 describes a hybrid resin system which contains a free-radical-hardenable resin and an epoxy resin. The hardeners contain an aliphatic amine and a peroxide, especially a perester. A disadvantage of such a hybrid system is that it cannot be provided in a storage-stable form, especially as a two-component system. This is because the peresters, on account of their reactive carbonyl group, rapidly react with amines.

The problem of the present invention is to provide a hybrid system that combines rapid low-temperature hardening, as in the case of free-radical-polymerisable systems, with significantly higher pull-out values, as in the case of polyaddition-hardening systems (epoxy/amine).

A further problem for preferred aspects of the present invention is the provision of a fixing composition in the form of a hybrid system which avoids ingredients posing a high risk to health and which is preferably non-hazard classified.

Surprisingly it has been found that it is possible to achieve the advantages of previous systems if—departing from the conventional types of polymerisation—use is made of a hybrid system which includes the starting materials for a Michael addition (N- and/or C-Michael addition) and for an enamine reaction and thus makes available the possible range of reactions mentioned below.

Michael-addition-hardening systems are known from the field of floor coatings. For example, US 2018/0134913 A1 describes a coating that includes a CH-acidic compound as component A and an activated α,β-unsaturated compound as component B. Both components cure in the presence of a strong base.

DE 40 34 279 A1 describes an enamine reaction for the production of crosslinked products for use as coating. The enamine reaction takes place spontaneously between polyacetoacetates (reaction resin having CH-acidic methylene groups) and polyamines. Since, however, the corresponding systems have gel times that are much too short for practical use, DE 40 34 279 A1 proposes the use of primary aminosilanes. As a result, the crosslinking reaction is no longer part of the enamine reaction but is dependent upon the hydrolysis and condensation reaction of the silane.

A composition based on vinyl polymers and amines which is hardenable by aza-Michael addition (N-Michael addition) is described in EP 1 970 408 A1. Epoxy resins which are also able to react with the amines are advantageously additionally present in the hardenable composition.

Disadvantages of the above-mentioned disclosures are inter alia the considerably too short gel times of the enamine reaction between polyacetoacetates and polyamines and the unsatisfactory performance of the aza-Michael addition systems in the drilled hole.

SUMMARY OF THE INVENTION

The subject matter of the invention in a first embodiment of the invention is a hybrid system which comprises the following constituents:
  a) reaction resin based on α,β-unsaturated compounds,
  b) reaction resin which includes compounds carrying CH-acidic methylene groups, and
  c) primary amine.

In addition, the hybrid system advantageously includes a catalyst.

The hybrid system is preferably implemented in multi-component form, especially two-component form, preferably in the form of a multi-component kit, such as a two-component kit.

In a further embodiment, the invention relates also to the use of a multi-component hybrid system, especially a two-component hybrid system, composed as just described, as an adhesive, especially for fixing anchoring means in substrates, such as masonry or concrete, or, furthermore, for fixing fibres, laid fabrics, woven fabrics or composites for reinforcement of built structures.

Corresponding processes and methods for mortar-bonded fixing of anchoring elements in holes or crevices, wherein a multi-component hybrid system, especially a two-component hybrid system, according to the invention (especially a multi-component or, preferably, two-component kit) is used for mortar-bonded fixing (adhesively bonded fixing) of anchoring means, the hybrid system and an anchoring means being introduced one after the other, especially first the hybrid system and then the anchoring means, or (at least substantially) simultaneously into a hole or crevice in a substrate (including in a cracked substrate, such as in cracked concrete), or mixed forms with partial introduction in each case, also form an embodiment of the invention.

Embodiments of the invention will also be found in the claims which are incorporated herein by reference.

DETAILED DESCRIPTION OF THE INVENTION

The inventors have surprisingly discovered that a hybrid system based on constituents a), b) and c) combines the advantages that are to be found, on the one hand, in free-radical-hardening chemical fixing systems and, on the other hand, in chemical fixing systems that harden by polyaddition, although no free-radical hardening is involved. This is surprising insofar as the reactions, which here take place in parallel, have never hitherto been combined in a hybrid system for chemical fixing technology.

The following reactions can take place between constituents a), b) and c):
i. Michael addition (α,β-unsaturated compound+CH-acidic compound)
ii. Aza-Michael addition (α,β-unsaturated compound+amine)
iii. Enamine reaction (CH-acidic compound+amine).

Without wishing to be bound by these explanations, depending upon the chosen molar ratios between constituents a), b) and c), it is possible for two of the said reactions to take place preferentially, but it cannot be ruled out that all three types of reaction will take place in parallel—albeit in some cases possibly only to a very small extent.

Reaction types i. to iii. are, each individually, known from the field of coatings, especially as floor coatings (see the corresponding patent specifications mentioned above). Since the forces arising in the drilled hole are entirely different from those of a (floor) coating, it was not obvious for the skilled person in the field of fixing technology for anchoring means to consider the use of the individually known reaction types i. to iii. on their own, or especially in the form of a hybrid system, for chemical fixing systems. For example, in the drilled hole—considered macroscopically—axial loading gives rise to enormous shear stresses which the system has to withstand, whereas a (floor) coating should rather withstand high compressive strengths and abrasion resistances.

Furthermore, it has been found that a hybrid system based on constituents a), b) and c) meets the criteria applicable for usability under building site conditions. Those criteria are inter alia, on the one hand, sufficient stability at high temperatures (<45° C.) in order to prevent dripping and/or running out of the drilled hole, and, on the other hand, sufficiently low viscosity at low temperatures (>−25° C.) in order to ensure it can be squeezed out of cartridges or the like by hand.

Hereinabove and hereinbelow, one, some or all relatively general terms or features can be replaced in each case by more specifically mentioned definitions (especially those mentioned hereinbelow), resulting in specific, especially preferred, embodiments of the invention.

Where "a" or "an" is used, this is to be primarily understood (unless otherwise apparent, for example by being preceded by "at least") as the indefinite article and includes "one (in figures: 1) or more" and also just one (in figures: 1). In other words, "a" or "an" means "one (1)" or "one or more, for example two or three or four".

Proportions or contents given in percent hereinabove and hereinbelow refer in each case to percent by weight ("% by weight") or the relative proportion by weight, unless otherwise indicated, relative to all ingredients of a hybrid system according to the invention (excluding packaging material), unless otherwise indicated or apparent.

"Include" or "comprise" means that other components or features may be present in addition to the components or features mentioned and therefore does not refer to an exhaustive list, unlike "consist(ing) of", the use of which does signify an exhaustive list of components or features. In embodiments of the invention, "include" or "comprise" can be replaced by "consist(ing) of".

Where the attribute "furthermore" is mentioned, this means that features without this attribute can be more preferred.

"And/or" means that the mentioned features/substances can in each case be present on their own or in a combination of two or more of the individually mentioned features/substances.

A reaction resin based on α,β-unsaturated compounds includes as α,β-unsaturated compound generally an ethylenically unsaturated compound in which the carbon double bond has been activated by an electron-attracting group (for example a carbonyl group in α-position). Such a reaction resin is especially to be understood as being one that comprises or (considered on its own as a reaction resin) consists of a compound that carries at least one, preferably two or more, fumarate, maleate, itaconate or especially acrylate group(s) ($H_2C=CH-CO-$), such as an acrylic acid ester or acrylamide, such as a mono- or especially di-, tri-, tetra- or higher polyacrylate, especially selected from hydroxy-$C_2$-$C_{10}$alkyl-acrylate, such as hydroxyethyl, hydroxypropyl or hydroxybutyl acrylate, ethanediol diacrylate, 1,3-propanediol diacrylate, 1,4-butanediol acrylate, poly(butanediol) diacrylate, polybutadiene diacrylate, 3-methyl-1,5-pentanediol diacrylate, 1,6-hexanediol diacrylate, diethyleneglycol diacrylate, tetraethyleneglycol diacrylate, tripropyleneglycol diacrylate, triethyleneglycol diacrylate, triisopropyleneglycol diacrylate, dipropyleneglycol diacrylate, neopentylglycol diacrylate, ethoxylated or propoxylated neopentylglycol diacrylate, tripropyleneglycol diacrylate, bisphenol-A-, bisphenol-F-, bisphenol-AF- or bisphenol-S-diglycidyl ether diacrylate, bisphenol-A-polyethoxydiacrylate, bisphenol-F-polyethoxydiacrylate, polyethyleneglycol diacrylates, polypropyleneglycol diacrylate, trimethylolpropane triacrylate, di-trimethylol-propane tetraacrylate, trimethylolpropane polyethoxytriacrylate, ethoxylated or propoxylated trimethylolpropane triacrylate, glycerol triacrylate, ethoxylated or propoxylated glycerol triacrylate, tris(2-acryloxyethyl) isocyanurate, pentaerythritol triacrylate, pentaerythritol monohydroxytriacrylate, pentaerythritol triethoxytriacrylate, pentaerythritol tetraacrylate, ethoxylated or propoxylated pentaerythritol tetraacrylate, ditrimethylolpropane tetraacrylate, dipentaerythritol pentaacrylate, dipentaerythritol polyhexanolide hexaacrylate, dipenta-erythritol hexaacrylate, tris(hydroxyethyl) isocyanuratopolyhexanolide triacrylate, tris(2-hydroxyethyl)isocyanuratotriacrylate, tricyclodecanedimethylol diacrylate, esterdiol diacrylate, 2-(2-acryloyloxy-1,1-dimethyl)-5-ethyl-5-acryloyloxymethyl-1,3-dioxane, tetrabromobisphenol-A-diethoxydiacrylate, 4,4-dimercapto-diphenylsulfide diacrylate, polytetraethyleneglycol diacrylate, 1,9-nonanediol diacrylate, 1,10-decanediol diacrylate, dimethylolpropane tetraacrylate, cresol epoxyacrylates, novolak "poly"acrylate, acrylate-group-containing oligomers or polymers from the reaction of polyepoxides with acrylic acid (or reactive derivatives thereof, such as acid halides or active esters) or from the reaction of polyester polyols with acrylic acid (or reactive derivatives thereof, especially as just mentioned), or urethane acrylates (obtainable, for example, by reaction of isocyanates with an OH-group-containing acrylate, such as hydroxyethyl-, hydroxypropyl-, hydroxybutyl- or pentaerythritol-tri-acrylate, and polyester acrylate resins, for example tetrafunctional polyester acrylates). Also possible are acrylic-functional alkoxysilanes or organopolysiloxanes (see WO2006/087079 A1), such as acrylatomethyl-trimethoxysilane, -methyldimethoxysilane, -dimethyl-methoxysilane, -triethoxysilane or -methyldiethoxysilane, acrylamidomethyl-trimethoxysilane, -methyldimethoxysilane, -dimethylmethoxysilane, -triethoxysilane, -methyldiethoxysilane, or -methyl-dimethylethoxysilane.

Alternatively, a reaction resin based on α,β-unsaturated compounds can also be understood as being a polyester resin based on maleic and/or fumaric and/or itaconic acid, and the respective anhydride thereof. Furthermore, polyester, polyurethane, polyether and/or alkyd resins that carry activated, ethylenically unsaturated groups are also to be understood as being such reaction resins. Acrylates (especially preferred), fumarates, itaconates and maleates, especially those characterised as being preferred in the present disclosure, are preferred reaction resins.

The said compounds can also be present as mixtures of two or more thereof.

Monoacrylates are also possible. They are less preferred, however, on account of their chain-terminating action or are present as additives to di- or poly-acrylates. Commercially available acrylates and/or fumarates and/or maleates and/or itaconates can be used. Monoacrylates that may be mentioned by way of example are tetrahydrofurfuryl acrylate, 2-phenoxyethyl acrylate, isobornyl acrylate and/or cyclic trimethylolpropane formalacrylate. More preferred monoacrylates include acrylated amines, obtainable, for example, from Sartomer. The mono-acrylates, -fumarates, -maleates and/or -itaconates can also be mixed with di- or poly-acrylates, -fumarates, -maleates and/or -itaconates.

Preferred compounds of this category also include α,β-unsaturated compounds having biogenic content (characterisable by the $^{14}$C content which, relative to the total carbon content, is higher than in the case of fossil substances), that is to say especially those which have been functionalised by (preferably biogenic) acrylic acid, for example via OH or, furthermore, SH or amino ($NH_2$) or imino (—NH) groups present in the (preferably likewise biogenic) complementary starting materials (raw materials) (with at least some of the acrylic acid and/or the complementary starting materials being biogenic), or two or more of those groups, especially those which contain hydroxy groups and have thus been functionalised to (correspondingly wholly or at least partly biogenic) acrylic acid esters, such as, for example, acrylates (preferably having biogenic acrylate content) of hydroxy-group-containing vegetable oils, such as of castor oil or soybean oil, wholly or at least partly biogenic (for example $C_1$-$C_{10}$)alkan(mono-, di-, tri-, tetra-, penta- or hexa- or poly-)ol acrylates, partly or preferably wholly biogenic polyglycerol acrylates, wholly or partly biogenic acrylates of sugar alcohols, such as mannitol, xylitol or sorbitol, wholly or partly biogenic acrylated fusel oils, wholly or partly biogenic 5- or 6-membered-ring heterocyclyl acrylates (especially having one or two hetero atoms selected from O, N and S in the ring), or partly or preferably wholly biogenic glycerol or polyglycerol acrylates, wholly or partly biogenic saccharide acrylates. Special preference is given to epoxidised soybean oil acrylate, 1,10-decanediol diacrylate, tetrahydrofuryl acrylate, isobornyl acrylate, sorbitol acrylate, lauryl (meth)acrylate, behenyl acrylate, propoxylated glycerol triacrylate, pentaerythritol triacrylate, pentaerythritol tetraacrylate, di-pentaerythritol pentaacrylate, tetrahydrofurfuryl methacrylate, polyethyleneglycol dimethacrylate, polyester acrylates, acrylated fusel oil, or biogenic glycerol triacrylate or one in which at least the acrylate content is biogenic. Special preference is likewise given to biogenic urethane acrylates (obtainable, for example, by reaction of isocyanates (such as, for example: Desmodur Eco N 7300) with an OH-group-containing acrylate, such as hydroxyethyl-, hydroxypropyl-, hydroxybutyl- or pentaerythritol-tri-acrylate, and polyester acrylate resins, for example tetrafunctional polyester acrylates).

The content of biobased carbon is determined via the $^{14}$C content on the basis of ASTM 6866 (Standard Test Method for Determining the Biobased Content of Solid, Liquid and Gaseous Samples Using Radiocarbon Analysis (ASTM International, D6866:2008, Method A).

Where reference is made to acrylates hereinabove and hereinbelow, this includes, furthermore, alternatively or in combination also the corresponding methacrylates (to be realised in more specific cases by insertion of "meth" before "acrylate").

A mixture of two or more α,β-unsaturated compounds (especially those mentioned above) is also possible.

The proportion of the reaction resin based on α,β-unsaturated compounds is preferably from 1 to 80% by weight, especially from 2 to 60% by weight.

A reaction resin that includes compounds carrying (one or more) CH-acidic methylene groups (activated methylene groups) is especially to be understood as one comprising malonic acid or malonic acid esters, such as malonic acid dimethyl ester, malonic acid diethyl ester, malonic acid di-n-propyl ester, malonic acid diisopropyl ester, malonic acid dibutyl ester, malonic acid di-(2-ethylhexyl) ester or malonic acid dilauryl ester; cyanoacetic acid esters, such as 2-ethylhexyl cyanoacetate, butyl cyanoacetate, octyl cyanoacetate, 2-methoxyethyl cyanoacetate; diones, such as pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester; acetoacetates, such as benzoylacetoacetic acid methyl, ethyl or butyl ester, propionylacetic acid methyl, ethyl or butyl ester, butyroylacetic acid methyl ester, acetoacetic acid methyl, ethyl, isopropyl, n-butyl, isobutyl or tert-butyl ester, acetoacetic acid (2-methoxyethyl) ester, acetoacetic acid (2-ethylhexyl) ester, acetoacetic acid lauryl ester, 2-acetoacetatoethyl acrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, free or ethoxylated bisphenol-A-, -F-, -AF- or -S-diacetoacetate, trimethylolpropane triacetoacetate, pentaerythritol tri- or tetra-acetoacetate, ditrimethylolpropane tetraacetoacetate, di pentaerythritol hexaacetoacetate, acetoacetate-group-carrying oligomers or polymers which are obtainable, for example, by transesterification of acetoacetic acid (for example ethyl) esters, acetoacetate-group-carrying oligomers or polymers which are obtainable by copolymerisation of acetoacetoxyethyl methacrylate, oligomers or polymers which are obtainable from dialkyl malonates and diols, or acetoacetylated novolaks, or a mixture of two or more thereof.

Very especially preferably, the reaction resin carrying CH-acidic methylene groups is an acetoacetate having at least two or more acetoacetate groups. As already indicated above (in the list of possible compounds given purely by way of example) the acetoacetates can be aliphatic, heteroaliphatic, cyclic, heterocyclic, cycloaliphatic and/or araliphatic.

The proportion of CH-acidic compound(s) is preferably from 1 to 80% by weight, especially from 2 to 60% by weight.

A mixture of two or more CH-acidic compounds (especially those mentioned above) is also possible.

CH-acidic compounds having methylene groups (—$CH_2$—), because they carry two hydrogen atoms, are to be regarded as mono- or di-functional.

A primary amine is to be understood as being any common amine hardener which could be used for crosslinking epoxy resins.

Preference is given, for example, to primary di- or polyamine (where "poly" also includes "oligo"). The amine can be both linear and branched. The amine molecular skeleton can contain aliphatic, heteroaliphatic, alicyclic, heterocyclic, aromatic, aliphatic-aromatic and silane/siloxane molecular structures or two or more selected independently therefrom. The primary amine can also be selected from the group of aminoamides, polyaminoamides, Mannich bases and the amine adducts (such as, especially, epoxy-amine adducts as described, for example, in EP 0 387 418 A2, isocyanate-amine adducts, Bucherer adducts and Michael addition adducts).

Especially suitable amines, without limiting the scope of the invention, are selected, for example, from the group of alkylamines (such as, for example: 1,2-diaminoethane, 2-methyl-pentanediamine, 2,2-dimethyl-1,3-propanediamine, 2,2,4- or 2,4,4-trimethylhexamethylene-diamine), heteroalkylamines (such as, for example: 1,13-diamino-4,7,10-trioxatridecane, commercially available amine-functionalised polyoxyalkylenes [Jeffamines] from Huntsman Corp., triethylenetetramine and/or higher homologues, cycloalkylamines (such as, for example: isophoronediamine, 1,3- and/or 1,4-bisaminomethylcyclohexane, TCD-diamine, 1,2- and 1,4-diaminocyclohexane, bis(4-aminocyclohexyl) methane, bis(4-amino-3-methyl-cyclohexyl)methane, norbornanediamine, diaminodicyclohexylmethane, 2,2-bis(4-amino-cyclohexyl) propane), heterocycloalkylamines (such as, for example: aminoethylpiperazine), and aliphatic-aromatic amines (such as 1,3- or 1,4-benzenedimethanamine), or a mixture of two or more of those compounds.

A possible preferred amine is especially a di- or polyamine, preferably 2-methylpentane-diamine (DYTEK A), 1,2-diaminocyclohexane (DCH), 1-amino-3-aminomethyl-3,5,5-trimethyl-cyclohexane (IPDA), 1,3-benzenedimethanamine (MXDA), 1,4-benzenedimethanamine (PXDA), 1,6-diamino-2,2,4-trimethylhexane (TMD), triethylenetramine (TETA), tetraethylene-pentamine (TEPA), pentaethylenehexamine (PEHA), N-aminoethylpiperazine (AEP), 1,3-bis(aminomethyl)cyclohexane (1,3-BAC), TCD-diamine, Jeffamines from the Huntsman company, dipropylenetriamine, N, N'-dicyclohexyl-1,6-hexanediamine, N, N'-dimethyl-1,3-diaminopropane, N,N'-diethyl-1,3-diaminopropane, N,N-dimethyl-1,3-diaminopropane, secondary polyoxypropylene-di- and -tri-amines, 2,5-diamino-2,5-dimethylhexane, bis-(aminomethyl)tricyclopentadiene, 1,8-diamino-p-menthane or bis(4-amino-3,5-dimethyl-cyclohexyl)methane, or a mixture of two or more of those compounds.

Also of particular interest as primary amine is an aminoalkylsilane that includes at least one hydrolysable group, such as alkoxy, for example methoxy or ethoxy—bonded to the silicon. Such an aminoalkylsilane is able to hydrolyse and condense (for example by water of reaction that forms or by added water) and thus form oligomers that carry a plurality of amino groups and fulfil the REACH definition for polymers. A preferred such aminoalkylsilane is, for example, selected from the group comprising one or more of the following compounds: aminoalkyl-tri- or -di-alkoxysilanes, such as 3-aminopropyl-trimethoxysilane, 3-aminopropyltriethoxysilane, 3-aminopropylmethyldiethoxysilane, 3-aminopropylethyldiethoxysilane, 3-amino-propylphenyldiethoxysilane, 4-aminobutyltriethoxysilane, 4-aminobutylethyldiethoxysilane, and N-(aminoalkyl)-amino-alkyl-tri- or -di-alkoxysilanes, such as N-(2-aminoethyl)-3-amino-propyltrimethoxysilane and N-(2-aminoethyl)-3-aminopropylmethyldimethoxysilane. A copolymer comprising one or more of the above-mentioned silanes and, furthermore, further silanes is also of special interest. Examples thereof that may be mentioned are the Dynasylans (such as Dynasylan 1146) from the Evonik company and the aminofunctional organo-polysiloxanes having the trade name Silres from the Wacker company (such as Silres HP 2000).

The proportion of (poly)amines is preferably from 0.2 to 60% by weight, especially from 1 to 40% by weight.

A mixture of two or more amines (especially those mentioned above) is also possible.

As catalyst for a hybrid system according to the invention, one (or two or more) catalysts selected from the following can advantageously be present:

Strongly basic catalysts (especially having a pKa of 11 or more), such as alkali metal hydroxides (for example sodium or potassium hydroxide), alkali metal alkoxides (for example sodium or potassium (m)ethoxide), quaternary ammonium compounds (for example tetra-butylammonium hydroxide, benzyltrimethylammonium hydroxide, tetrabutylammonium carbonate), tertiary amines (for example diazabicyclooctane (also referred to as DABCO) and guanidines/amidines (for example tetramethylguanidine, 1,8-diazabicyclo[5.4.0]undec-7-ene, 1,5-diazabicyclo[4.3.0.]non-5-ene), silicates (for example sodium silicate) and metal oxides (for example calcium oxide); phosphine catalysts, for example tricyclohexylphosphine (especially preferred), tricyclopentylphosphine, tri-n-hexylphosphine, tris(2,4,4-trimethyl-pentyl)phosphine, tris(2-ethylhexyl)phosphine, tri-n-octylphosphine (especially preferred), tri-n-decylphosphine, tri-n-dodecylphosphine (especially preferred), tristearylphosphine and triphenylphosphine.

A further suitable catalyst (obtained after mixing of the components of a hybrid system according to the invention) is a mixture of an epoxide (having epoxy groups as glycidyl esters (preferably as low molecular weight glycidyl esters), glycidyl ethers, such as the diglycidyl ether of bisphenol A, or epoxidation products of alpha-olefins) with one or more tertiary amines (especially triethylenediamine, Mannich reaction products, or the acrylated amines already mentioned above (obtainable from Sartomer)), as described in EP 0 326 723 (also referred to hereinbelow as epoxy/tert-amine catalysts). The epoxide can advantageously be present in the component with the $\alpha,\beta$-unsaturated compound or the CH-acidic compound or both, and the tertiary amine can be present in the component with the $\alpha,\beta$-unsaturated compound. Salts of strong bases (or small amounts of the strong bases themselves), such as tetramethylguanidine, DABCO (1,8-diazabicyclo(5.4.0)undec-7-ene) or quaternary ammonium hydroxides can additionally be added, for example distributed in such a way that the strong base moiety is present in one component (preferably not the component with the CH-acidic compound), and the epoxide is present in a different component. The constituents react on mixing and form a strong catalytically active base.

Possible catalysts are, furthermore, carbon-dioxide-blocked strong bases, such as quaternary alkylammonium bicarbonates or alkyl carbonates, which are, however, less preferred because they release $CO_2$, except for applications where this is not troublesome or is even desirable, for example thermally insulating coatings.

It is also possible for two or more of the mentioned catalysts to be present.

The catalysts are preferably added in amounts of from 0.01 to 15% by weight, especially from 0.1 to 10% by weight.

A multi-component kit (or set) is especially to be understood as being a two-component kit, preferably a two-chamber device or, furthermore, a multichamber device, in which the constituents that are capable of reacting with one another are contained in such a way that they cannot lead to undesired reactions during storage, preferably in such a way that the constituents that react with one another cannot come into contact with one another prior to use. Capsules are a possibility. Especially suitable, however, are cartridges or foil pouches having two or, furthermore, more chambers, or containers such as buckets or tubs having a plurality of chambers or sets (for example packs) of two or more such containers, wherein two or more components of the particular hardenable hybrid system, especially two components, are present physically separate from one another in the form of a kit or set, in which case the contents, after being mixed together or while being mixed together, are applied to the site of use (especially by means of application devices, such as trowels or brushes or a static mixer), for example to a surface for fixing fibres, laid fabrics, woven fabrics, composites or the like, or especially to a recess, preferably a drilled hole, especially for fixing anchoring means such as anchor rods or the like; and also multi-component cartridges or, especially, two-component cartridges, the chambers of which contain the plurality of components or preferably two components for a hybrid system according to the invention especially for fixing purposes having the constituents mentioned hereinabove and hereinbelow for storage prior to use, the kit in question preferably also including a static mixer. In the case of the foil pouches and the multi-component cartridges, the multi-component kit can also include a discharge device (for example an applicator gun), but this can preferably also (for example for multiple use) be packaged and sold independently of the kit.

The reactive constituents of a hybrid system according to the invention (to be understood as meaning primarily constituents a), b) and c) and the catalyst) are divided between the components of the multi-component system, especially the multi-component kit, in such a way that constituents that react with one another do not come into contact with one another prior to use (especially during manufacture, storage and transport) (the constituents are separated from one another so as to inhibit reaction). Appropriate divisions will be readily evident to the person skilled in the art.

In a possible preferred variant of a multi-component kit according to the invention, constituents a) and b) are present in one component (K1), while constituent c) is present together with the catalyst in a different component (K2) (which component is not capable of mixing, that is to say is kept separate, in the stored state), it being optionally possible in each case for one or more further additional ingredients to be present.

If the catalyst is an epoxy/tert-amine catalyst, this can also be divided between the two components. In that case, in a possible preferred variant of a multi-component kit according to the invention constituents a), b) and the epoxy moiety of an epoxy/tert-amine catalyst are present in one component (K1), and constituent c) is present together with the tert-amine moiety of an epoxy/tert-amine catalyst in a different component (K2), it likewise being optionally possible in each case for one or more further additional ingredients to be present.

In addition to the constituents already mentioned, a hybrid system according to the invention preferably comprises one or more further additives, especially selected from fillers, rheology aids, thixotropic agents, plasticisers, colouring additives and adhesion promoters, furthermore solvents and/or reactive diluents.

As thixotropic agents there can be used customary thixotropy-imparting rheology aids, such as pyrogenic silica, bentonite, alkyl and methyl celluloses, castor oil derivatives or the like. They can be added, for example, in a proportion by weight of from 0.01 to 50% by weight, especially from 0.5 to 20% by weight, for example from 0.1 to 5% by weight.

As fillers there can be used customary fillers having a fine average particle size (for example average particle size d50 of 50 µm or less, especially 40 µm or less, preferably 30 µm or less, advantageously 25 µm or less, for example preferably 20 µm or less, very preferably 10 µm or less, especially 5 µm or less, most especially 1 µm or less) or a relatively large average particle size, especially chalks, sand, quartz sand, quartz powder, stone dusts, glass, porcelain, corundum, ceramics, silicates, clays, barite, aluminium hydroxide, calcium carbonate or the like, which can be added in the form of powders, in granular form or in the form of shaped bodies, or other fillers, such as kernel or shell flours obtained from plants, which increases the biogenic carbon content, such as olive stone flour, coconut shell flour or furthermore walnut shell flour, or also hydraulic fillers, such as gypsum, burnt lime or cement (for example alumina cement or Portland cement), water glasses or active aluminium hydroxides, or mixtures of two or more thereof, it being possible for the fillers furthermore or especially also to be silanised. The fillers can be present in one or more components of a multi-component hybrid adhesive according to the invention, for example in one or both components of a corresponding two-component kit; the proportion of fillers is preferably from 0 to 90% by weight, for example from 10 to 70% by weight (casing material broken during the installation of anchoring elements (for example splintered glass or splintered plastics), for example fragments of capsules, also can be counted as filler or, preferably, is counted as filler).

The d50 average particle size is defined as the particle size at which 50% of the particles by weight are smaller than the stated d50 particle size. There are various and technically generally recognised methods for determining the d50, for example by means of particle size distribution curve analyses customarily using sieves or, for example, (especially in the case of relatively small particles of less than 1 µm diameter) by means of laser granulometry. In the case of commercially available fillers, where applicable the average particle size corresponds to manufacturers' data.

Adhesion promoters that come into consideration are silane coupling agents having functional groups such as amino, mercapto, epoxy, vinyl or halogen, such as γ-aminopropyl-methyldimethoxysilane, γ-aminopropylmethyldiethoxysilane, γ-(2-aminoethyl)aminopropyl-trimethoxysilane, γ-aminopropyltrimethoxysilane, γ-(2-aminoethyl) aminopropylmethyl-diethoxysilane, γ-(2-aminoethyl) aminopropyltriisopropoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, γ-mercaptopropyltrimethoxysilane, γ-mercapto-propyl-triethoxysilane, γ-mercaptopropylmethyldimethoxysilane, γ-mercaptopropylmethyl-dimethoxysilane, γ-glycidyloxypropyltrimethoxysilane, γ-glycidylpropyltriethoxysilane, γ-glycidyloxypropylmethyldimethoxysilane, β-(3,4-epoxycyclohexyl)ethyltrimethoxysilane, β-(3,4-epoxycyclohexyl) ethyltriethoxysilanes, vinyltrimethoxysilane, vinyltriethoxysilane, γ-acryloyloxypropylmethyltriethoxysilane, γ-chloropropyltrimethoxysilane, or the like; modified derivatives thereof, such as amino-modified silyl polymers, silylated aminopolymers, unsaturated aminosilane complexes, phenylamino-alkylsilanes, aminosilylated silicones, or silylated polyesters, or a mixture of two or more thereof.

Further additives can also be added, such as plasticisers, non-reactive diluents, flexibilisers, stabilisers, rheology aids, wetting and dispersing agents, colouring additives, such as dyes or especially pigments, for example for staining the components different colours for better monitoring of their intermixing, or the like, or a mixture of two or more thereof. Such further additives can preferably be added in total in proportions by weight of in total from 0 to 90%, for example from 0 to 40% by weight.

All constituents of hybrid systems according to the invention are known, are obtainable by methods known per se (for example from the patent specifications cited as prior art at the beginning or, in respect of urethane acrylates, DE 4 111 828 A1), or are commercially available.

Alkyl preferably denotes a linear or singly or multiply branched, saturated (acyclic) hydrocarbon radical having up to 20 carbon atoms, for example $C_1$-$C_8$alkyl, especially $C_1$-$C_4$alkyl, such as especially methyl, ethyl, n-propyl, isopropyl, n-butyl, isobutyl, tert-butyl or the like. Where reference is made to $C_1$-$C_4$alkyl, the number 1-4 always relates to the alkyl group itself (and does not include adjacent parts of the molecule, such as, for example, -carbonyl or -carbonylmethyl).

Parameters ("material-specific properties"), insofar as they are described in the context of the present application, are determined in accordance with methods known to the person skilled in the art, especially as follows:

For pull-out tests using M12 threaded rods, the following procedure, in accordance with ETAG 001 PART 5, (Publisher DIBt, Berlin 2008), is carried out:

First of all, a hammer drill and a hammer drill bit are used to drill holes (diameter 14 mm; depth 60 mm) in a concrete test specimen (concrete type C20/25) lying in a horizontal position. The drilled holes are cleaned using a hand blower and a hand brush. The drilled holes are then filled two-thirds full with the particular hardenable composition for fixing purposes to be tested. A threaded rod is pushed into each drilled hole by hand. The excess mortar is removed using a trowel. After 24 hours at room temperature, the threaded rod is subjected to pulling until failure occurs, the failure load being measured.

The gel time of a 30 g mixture is determined in a plastics beaker at 23° C. by means of manual stirring. On reaching the gel point, the mixture, which was previously fluid, becomes highly viscous and gel-like, which becomes apparent inter alia by the formation of lumps. At that point the clock, which was started at the beginning of the test, is stopped. The gel time can be read off directly.

The onset/glass transition temperature (Tg) (an indirect measure inter alia of the thermal dimensional stability) is measured by means of dynamic differential calorimetry (DSC) in accordance with ISO 11357-2 (2013) using specimens cured for 24 h.

EXAMPLES: THE EXAMPLES THAT FOLLOW SERVE TO ILLUSTRATE THE INVENTION BUT DO NOT LIMIT THE SCOPE THEREOF

TABLE 1

Constituents and abbreviations used

| Abbreviation | Item |
|---|---|
| RMA | Real Michael addition/C-Michael addition |
| AMA | Aza-Michael addition/N-Michael addition |
| En | Enamine reaction |
| TMPTAcAc | Trimethylolpropane triacetoacetate |
| ISDAcAc | Isosorbide diacetoacetate |
| TMPTA | Trimethylolpropane triacrylate |
| CN9165A | aromatic urethane acrylate oligomer (Sartomer) |
| TMG | N,N,N',N'-Tetramethylguanidine |
| MXDA | Meta-xylylenediamine |
| 1146 | Dynasylan 1146; oligomeric diaminosilane (Evonik Industries) |
| Dytek A | Dytek A; 2-methylpentamethylenediamine (INVISTA Specialty Intermediates) |
| EDR148 | Jeffamine EDR-148 (amine-functionalised polyoxyalkylene from Huntsman Corporation) |
| TETA | Triethylenetetraamine (Huntsman Corporation) |
| BAC | 1,3-Bis(aminomethyl)cyclohexane (Mitsubishi Gas Chemical Company, Inc.) |
| AEP | Aminoethylpiperazine (Huntsman Corporation) |
| IPDA | Isophoronediamine (BASF) |
| DCH-99 | 1,2-Diaminocyclohexane (INVISTA Specialty Intermediates) |
| AMMO | Dynasylan AMMO; 3-aminopropyltrimethoxysilane (Evonik Industries) |
| RD20 | ipox RD20; Trimethylolpropane triglycidyl ether (ipox chemicals) |
| Minex-10 | Micronized functional filler produced from nepheline syenite, a natural silica deficient sodium-potassium alumina silicate (The Cary Company, Illinois, USA) |

Example 1: Composition and Pull-Out Tests from Concrete of Hybrid Systems According to the Invention (RMA+AMA Preferred)

Setting tests are carried out in accordance with the aforementioned methods for determining parameters for "pull-out tests from concrete". Table 2 shows the constituents used and the bond stresses determined. The amount of primary amines used and the primary amino (—$NH_2$) groups present in the system as a result are balanced by additional acrylate groups, so that reactions i. and ii. can take place preferentially.

TABLE 2

Formulations of the setting tests and bond stresses determined

| Item | B1.1 | B1.2 | B1.3 | B1.4 | B1.5 |
|---|---|---|---|---|---|
| TMPTAcAc [g] | 5.51 | 5.51 | 3.67 | 5.51 | 3.67 |
| TMPTA [g] | 9.82 | 10.25 | 8.43 | 11.12 | 10.60 |
| TMG [g] | 0.10 | 0.10 | 0.07 | 0.10 | 0.07 |
| MXDA [g] | 0.10 | 0.20 | 0.50 | 0.20 | 0.50 |
| Minex-10 [g] | 15.53 | 16.07 | 12.67 | 16.94 | 14.85 |
| Bond stress [N/mm$^2$] | 33.0 | 33.8 | 35.7 | 33.3 | 32.0 |

In Examples B1.1 to B1.3 the molar ratio of the primary amino groups to acrylate groups is 1:1 ($NH_2$:C═C=1:1), whereas in Examples B1.4 and B1.5 a 1:2 ratio (NH:C═C=1:1) between primary amino groups and acrylate groups was chosen.

The bond stresses listed in Table 2 demonstrate the tremendous performance of the hybrid system according to the invention. Furthermore, Table 2 demonstrates the robustness of the hybrid system, since both the content of primary amine and the molar ratios between amino groups and acrylate groups can be varied within a wide range without suffering loss of performance.

Example 2: Compositions and Pull-Out Tests from Concrete with Different Primary Amines (RMA+AMA Preferred)

In order to demonstrate that all primary amines can be used in the hybrid systems according to the invention, one example is selected from each of the afore-mentioned groups of primary amines and setting tests are carried out in accordance with the afore-mentioned parameters.

TABLE 3

Formulations of the amine screening and bond stresses determined

| Item | B2.1 | B2.2 | B2.3 | B2.4 | B2.5 | B2.6 | B2.7 | B2.8 |
|---|---|---|---|---|---|---|---|---|
| TMPTAcAc [g] | 5.51 | 5.51 | 5.51 | 5.51 | 5.51 | 5.51 | 5.51 | 5.51 |
| TMPTA [g] | 9.69 | 10.23 | 10.05 | 10.06 | 10.08 | 10.15 | 9.96 | 10.25 |
| TMG [g] | 0.10 | 0.10 | 0.10 | 0.10 | 0.10 | 0.10 | 0.10 | 0.10 |
| 1146 [g] | 0.50 | | | | | | | |
| Dytek A [g] | | 0.50 | | | | | | |
| EDR148 [g] | | | 0.50 | | | | | |
| TETA [g] | | | | 0.50 | | | | |
| BAC [g] | | | | | 0.50 | | | |
| AEP [g] | | | | | | 0.50 | | |
| IPDA [g] | | | | | | | 0.50 | |
| DCH-99 [g] | | | | | | | | 0.50 |
| Minex-10 [g] | 15.81 | 16.35 | 16.17 | 16.17 | 16.19 | 16.26 | 16.08 | 16.36 |
| Bond stress [N/mm$^2$] | 34.7 | 30.9 | 31.5 | 30.2 | 31.7 | 30.7 | 30.0 | 32.3 |
| Gel time [mm:ss] | 02:28 | 02:38 | 02:36 | 02:20 | | | | |

It will be apparent from Table 3 that all primary amines can be used in the hybrid systems according to the invention. Table 3 also demonstrates that using the hybrid systems according to the invention it is possible to combine the advantages of the systems previously used—in chemical fixing technology: rapid curing as in the case of free-radical-hardening systems and the high bond stresses of epoxy systems. This is demonstrated by the gel times and bond stresses determined. Example B2.1 is mixed again with half the amount of TMG. The resulting gel time is 07:20 [mm:ss]. This test shows that the gel time can be controlled and adjusted to a desired gel time by means of the amount of catalyst used.

Example 3: Compositions and Pull-Out Tests from Concrete of Hybrid Systems According to the Invention (RMA+En Preferred)

Table 4 below shows the constituents used and the bond stresses determined of hybrid systems according to the invention in which the amount of primary amines used and the primary amine groups (—NH$_2$) present in the system as a result are balanced by CH-acidic methylene groups (—CH$_2$—), so that reactions i. and iii. can take place preferentially.

TABLE 4

Formulations of the setting tests and bond stresses determined

| Item | B3.1 | B3.2 | B3.3 | B3.4 | B3.5 | B3.6 | B3.7 |
|---|---|---|---|---|---|---|---|
| TMPTAcAc [g] | 5.80 | 6.09 | 5.57 | 5.62 | 4.85 | 5.29 | 4.66 |
| TMPTA [g] | 9.38 | 9.38 | 7.51 | 9.38 | 7.51 | 7.51 | 7.51 |
| TMG [g] | 0.10 | 0.10 | 0.08 | 0.10 | 0.08 | 0.08 | 0.08 |
| MXDA [g] | 0.15 | 0.30 | 0.60 | | | | |
| AMMO [g] | | | | 0.15 | 0.60 | 1.20 | |
| 1146 [g] | | | | | | | 0.60 |
| Minex-10 [g] | 15.44 | 15.88 | 13.76 | 15.26 | 13.04 | 14.08 | 12.85 |
| Bond stress [N/mm$^2$] | 30.3 | 32.9 | 33.4 | 32.5 | 35.0 | 38.0 | 30.9 |

Table 4 also illustrates the tremendous performance of the hybrid systems according to the invention already indicated in Table 2, as well as the robustness thereof.

Example 4: Pull-Out Tests from Concrete with Mixtures of Constituents a, b and c In order to show that it is also possible to use different mixtures of ingredients of constituents a, b and c in the hybrid systems according to the invention, setting tests are carried out in accordance with ETAG 001 PART 5. Table 5 lists the constituents used and the bond stressed determined.

TABLE 5

Formulations with mixtures a, b, c and bond stresses determined

| Item | B4.1 | B4.2 | B4.3 |
|---|---|---|---|
| TMPTAcAc [g] | 3.00 | 4.60 | 5.43 |
| ISDAcAc [g] | 3.00 | | |
| TMPTA [g] | 9.20 | 5.25 | 7.51 |
| CN9165A [g] | | 1.75 | |
| TMG [g] | 0.10 | 0.08 | 0.08 |
| MXDA [g] | 0.50 | 0.30 | 0.30 |
| AMMO [g] | | | 0.60 |
| Minex-10 [g] | 15.80 | 11.98 | 13.92 |
| Bond stress [N/mm$^2$] | 29.6 | 31.5 | 35.7 |

In Example B4.1 the additional primary amino groups are saturated by acrylate groups (RMA+AMA preferred), whereas in Examples B4.2 and B4.3 the amino groups are saturated by CH-acidic methylene groups (—CH$_2$-) (RMA+En preferred). The high bond stresses demonstrate that it is also possible to use varying mixtures of ingredients of constituents a, b and c for formulating hybrid systems according to the invention.

The very high bond stresses of Examples B3.5, B3.6 and B4.3, in which the silane AMMO is used, are remarkable. Without wishing to be bound to this theory, a possible reason for the very high performance may be that water is formed by the enamine reaction of the primary amine with the compound carrying CH-acidic methylene groups (—CH$_2$—). This in turn brings about a hydrolysis and condensation reaction of the silane AMMO. Together with the Michael addition (real Michael addition/C-Michael addition) between the α,β-unsaturated compound and the compound carrying CH-acidic methylene groups there is thus formed a strongly crosslinked and close-knit network, which would explain the very high bond stresses.

Example 5: Reference Tests

In order once again to underline the tremendous performance of the hybrid systems according to the invention, reference tests were carried out and the following bond stresses determined.

TABLE 6

Reference tests in comparison with hybrid systems according to the invention

| Item | Ref1 | Ref2 | B2.4 |
|---|---|---|---|
| TMPTAcAc | | | 5.51 |
| TMPTA [g] | 9.96 | | 10.06 |
| RD20 [g] | | 10.57 | |
| TETA [g] | 2.46 | 1.84 | 0.50 |
| TMG [g] | 0.10 | 0.10 | 0.10 |
| Minex-10 [g] | 12.50 | 12.50 | 16.17 |
| Bond stress [N/mm$^2$] | 21.0 | 16.2 | 30.2 |

It will be apparent from Table 6 that neither reference test Ref1 (acrylate—amine/N-Michael addition) nor reference test Ref2 (classic epoxide—amine reaction) achieves the high bond stresses of the hybrid systems according to the invention, despite a similar chemical structure of the starting materials.

Example 6: Composition and Determination of the Onset and Glass Transition Temperatures of Hybrid Systems According to the Invention On exceeding the glass transition temperature, a solid polymer enters into a rubber-like to viscous state. In other words, the glass transition temperature is a measure of strength under the effect of heat. Since high temperatures can occur on building sites, depending upon the weather conditions, it is desirable to develop systems having correspondingly high glass transition temperatures. Table 7 below shows the onset and glass transition temperatures of hybrid systems according to the invention in comparison with a standard epoxy/amine system.

TABLE 7

Onset and glass transition temperatures of hybrid systems according to the invention

| Item | B6.1 | B6.2 | B6.3 | B6.4 | B6.5 | B6.6 | B6.7 | B6.8 | FIS EM |
|---|---|---|---|---|---|---|---|---|---|
| TMPTAcAc [g] | 3.67 | 5.51 | 5.51 | 5.51 | 5.51 | 5.51 | 5.51 | 5.51 | |
| TMPTA [g] | 6.98 | 10.23 | 10.05 | 10.06 | 10.08 | 10.15 | 9.96 | 10.25 | |
| TMG [g] | 0.07 | 0.10 | 0.10 | 0.10 | 0.10 | 0.10 | 0.10 | 0.10 | |
| MXDA [g] | 0.50 | | | | | | | | |
| Dytek A [g] | | 0.50 | | | | | | | |
| EDR148 [g] | | | 0.50 | | | | | | |
| TETA [g] | | | | 0.50 | | | | | |
| BAC [g] | | | | | 0.50 | | | | |
| AEP [g] | | | | | | 0.50 | | | |
| IPDA [g] | | | | | | | 0.50 | | |
| DCH-99 [g] | | | | | | | | 0.50 | |
| 1st run: onset 24 h [° C.] | 54.9 | 52.2 | 48.7 | 51.4 | 53.0 | 54.6 | 51.9 | 54.0 | 51.6 |
| 2nd run: Tg 24 h [° C.] | 104.0 | 107.9 | 97.9 | 108.6 | 107.0 | 102.6 | 112.4 | 112.3 | 82.9 |

FIS EM 390 S® (fischerwerke GmbH & Co. KG, Waldachtal, Germany) is a successful, commercially well-established example of a two-component injection mortar system for mortar-bonded fixing of anchoring elements, based on an epoxy/amine reaction. Table 7 shows that the onset temperatures of the hybrid systems according to the invention are comparable with those of a well-established injection mortar system and even surpass that system in respect of the glass transition temperature in the second run. The hybrid systems according to the invention accordingly also have the necessary thermal dimensional stability required under building site conditions.

The invention claimed is:

1. A method for mortar-bonded fixing of anchoring elements in a hole or a crevice in a substrate, comprising introducing a hybrid system adhesive and an anchoring means one after the other or simultaneously or in a mixed form with partial introduction in each case, into a hole or crevice in a substrate, wherein the hybrid system includes as constituents a) a reaction resin based on α,β-unsaturated compounds, b) a reaction resin based on compounds that include CH-acidic methylene groups, and c) a primary amine and allowing the parallel reaction of constituents a), b) and c) to harden.

2. The method for mortar-bonded fixing of anchoring elements in holes or crevices according to claim 1, comprising using a-introducing the hybrid system and an anchoring means one after the other or simultaneously into a hole or crevice in a substrate.

3. The method according to claim 2, wherein the hybrid system is in the form of a two-component system.

4. The method according to claim 2, wherein the hybrid system further includes a catalyst.

5. The method according to claim 2 wherein the hybrid system is used in the form of a two-component kit, wherein (i) constituents a) and b) are present in one component, while constituent c) is present together with a catalyst in a different component which is not capable of mixing in the stored state, it being optionally possible in each case for one or more further ingredients to be present; or (ii) constituents a), b) and the epoxy moiety of an epoxy/tert-amine catalyst are present in one component, and constituent c) is present together with the tert-amine moiety of an epoxy/tert-amine catalyst in a different component, it being optionally possible in each case for one or more further additional ingredients to be present.

6. The method according to claim 2, wherein, in the hybrid system, the reaction resin based on α,β-unsaturated compounds is a reaction resin-selected from the group consisting of hydroxy-$C_2$-$C_{10}$alkyl-acrylate, ethanediol diacrylate, 1,3-propanediol diacrylate, 1,4-butanediol acrylate, poly (butanediol) diacrylate, polybutadiene diacrylate, 3-methyl-1,5-pentanediol-diacrylate, 1,6-hexanediol diacrylate, diethyleneglycol diacrylate, tetraethyleneglycol diacrylate, tripropyleneglycol diacrylate, triethyleneglycol diacrylate, triisopropyleneglycol diacrylate, dipropyleneglycol diacrylate, neopentylglycol diacrylate, ethoxylated or propoxylated neopentylglycol diacrylate, tripropyleneglycol diacrylate, bisphenol-A-, bisphenol-F-, bisphenol-AF-or bisphenol-S-diglycidyl ether diacrylate, bisphenol-A-polyethoxydiacrylates, bisphenol-F-polyethoxydiacrylates, polyethyleneglycol diacrylates, polypropyleneglycol diacrylates, trimethylolpropane triacrylate, di-trimethylolpropane tetraacrylate, trimethylolpropane polyethoxytriacrylate, ethoxylated or propoxylated trimethylolpropane triacrylate, glycerol triacrylate, ethoxylated or propoxylated glycerol triacrylate, tris (2-acryloxyethyl) isocyanurate, pentaerythritol triacrylate, pentaerythritol monohydroxytriacrylate, pentaerythritol triethoxytriacrylate, pentaerythritol tetraacrylate, ethoxylated or propoxylated pentaerythritol tetraacrylate, ditrimethylolpropane tetraacrylate, dipentaerythritol pentaacrylate, dipentaerythritol polyhexanolide hexaacrylate, dipentaerythritol hexaacrylate, tris (hydroxyethyl) isocyanuratopolyhexanolide triacrylate, tris (2-hydroxyethyl)isocyanuratotriacrylate, tricyclodecanedimethylol diacrylate, esterdiol diacrylate, 2-(2-acryloyloxy-1,1-dimethyl)-5-ethyl-5-acryloyloxymethyl-1,3-dioxane, tetrabromobisphenol-A-diethoxydiacrylate, 4,4-dimercaptodiphenylsulfide diacrylate, polytetraethyleneglycol diacrylate, 1,9-nonanediol diacrylate, 1, 10-decanediol diacrylate, dimethylolpropane tetraacrylate, cresol epoxyacrylates, novolak "poly" acrylate, acrylate-group-containing oligomers or polymers from the reaction of polyepoxides with acrylic acid or reactive derivatives which are acid halides or active esters or from the reaction of polyester polyols with acrylic acid or reactive derivatives thereof as just mentioned, urethane acrylates obtainable by reaction of isocyanates with an OH-group-containing acrylate selected from the group consisting of hydroxyethyl-, hydroxypropyl-, hydroxybutyl-or pentaerythritol-tri-acrylate, and tetrafunctional polyester acrylates); an acrylic-functional alkoxysilane or organopolysiloxane selected from the group consisting of acrylatomethyl-trim ethoxysilane,-methyldimethoxysilane,-dimethylmethoxysilane,-triethoxysilane or -methyldiethoxysilane, acrylamidomethyl-trimethoxysilane,-methyldimethoxysilane,-dimethylmethoxysilane, -triethoxysilane, or-methyldiethoxysilane,-methyl-dimethylethoxysilane; a polyester resin based on maleic, fumaric or itaconic acid or a respective anhydride thereof;

a polyester, polyurethane, polyether and/or alkyd resin that carries activated, ethylenically unsaturated groups;

and an α,β-unsaturated compound having biogenic content having biogenic acrylate content of hydroxy-group-containing vegetable oils, selected from the group consisting of castor oil or soybean oil, a wholly or at least partly biogenic C1-C10) alkan (mono-, di-, tri-, tetra-, penta-or hexa-or poly-) ol acrylate, a partly or wholly biogenic polyglycerol acrylate, a wholly or partly biogenic acrylate of one or more sugar alcohols selected from the group consisting of mannitol, xylitol and sorbitol, a wholly or partly biogenic acrylated fusel oil, a wholly or partly biogenic 5-or 6-membered-ring heterocyclyl acrylate having one or two hetero atoms selected from O, N and S in the ring, or a partly or wholly biogenic glycerol or polyglycerol acrylate, and a wholly or partly biogenic saccharide acrylate; or the corresponding methacrylates;

or a mixture of two or more of the mentioned α,β-unsaturated compounds;

the reaction resin based on compounds that include one or more CH-acidic methylene groups is one comprising malonic acid or a malonic acid ester, cyanoacetic acid esters, an acetoacetate, an acetoacetate-group-carrying oligomer or polymer which is obtainable, by transesterification of acetoacetic acid esters, an acetoacetate-group-carrying oligomer or polymer which is obtainable by copolymerisation of acetoacetoxyethyl methacrylate, an oligomer or polymer which is obtainable from dialkyl malonates and diols, or an acetoacetylated novolak, or a mixture of two or more thereof;

the primary amine is selected from the group consisting of 1,2-diaminoethane, 2-methylpentanediamine, 2,2-dimethyl-1,3-propanediamine, 2,2,4-or 2,4,4-trimethylhexamethylenediamine, 1,13-diamino-4, 7, 10-trioxatridecane, commercially available amine-functionalised polyoxyalkylenes, triethylenetetramine, isophoronediamine, 1,3-and/or 1,4-bisaminomethylcyclohexane, TCD-diamine, 1,2-or 1,4-diaminocyclohexane, bis (4-aminocyclohexyl) methane, bis (4-amino-3-methylcyclohexyl) methane, norbornanediamine, diaminodicyclohexylmethane, 2,2-bis (4-aminocyclohexyl)propane, aminoethylpiperazine, 1,3-or 1,4-benzenedimethanamine, 1-amino-3-aminomethyl-3,5,5-trimethylcyclohexane, 1,3-benzenedimethanamine, 1,4-benzenedimethanamine, 1,6-diamino-2,2,4-trimethylhexane, triethylenetetramine, tetraethylenepentamine, pentaethylenehexamine, N-aminoethylpiperazine, 1,3-bis (aminomethyl) cyclohexane, TCD-diamine, Jeffamines, dipropylenetriamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene-di-and-tri-amines, 2,5-diamino-2,5-dimethylhexane, bis (aminomethyl) tricyclopentadiene, 1,8-diamino-p-menthane and bis (4-amino-3, 5-dimethylcyclohexyl)methane, an aminoalkylsilane that includes at least one hydrolysable alkoxy group selected from the group consisting of one or more of the following compounds: 3-aminopropyl-trimethoxysilane, 3-aminopropyltriethoxysilane, 3-aminopropylmethyldiethoxysilane, 3-aminopropylethyldiethoxysilane, 3-aminopropylphenyldiethoxysilane, 4-aminobutyltriethoxysilane, 4-aminobutylethyl-diethoxysilane, N-(2-aminoethyl)-3-am inopropyltrimethoxysilane and N-(2-aminoethyl)-3-aminopropylmethyldimethoxysilane; or a copolymer of one of the above-mentioned silanes or a different silane;

or a mixture of two or more of the mentioned (poly) amines; and the hybrid system includes as catalyst a catalyst or two or more thereof, selected from the group consisting of alkali metal hydroxides, alkali metal alkoxides, quaternary ammonium compounds, tertiary amines, quanidines, amidines; silicates;

metal oxides; tricyclohexylphosphine, tricyclopentylphosphine, tri-n-hexylphosphine, tris (2,4,4-trimethylpentyl) phosphine, tris (2-ethylhexyl) phosphine, tri-n-octylphosphine, tri-n-decylphosphine, tri-n-dodecylphosphine, tristearylphosphine, triphenylphosphine; and catalysts in the form of mixtures of an epoxide with one or more tertiary amines, it being possible for salts of strong bases or small amounts of the strong bases themselves additionally to be added; or a mixture of two or more of the mentioned catalysts.

7. The method according to claim 1, wherein the hybrid system further includes a catalyst.

8. The method according to claim 7, wherein the hybrid system includes as catalyst a catalyst or two or more thereof, selected from the group consisting of strongly basic catalysts, and catalysts in the form of mixtures of an epoxide with one or more tertiary amines, it being possible for salts of strong bases or small amounts of the strong bases themselves additionally to be added; or a mixture of two or more of the mentioned catalysts.

9. The method according to claim 7, wherein the hybrid system includes as catalyst a catalyst or two or more thereof, selected from the group consisting of alkali metal hydroxides, alkali metal alkoxides, quaternary ammonium compounds, tertiary amines, guanidines, amidines; silicates; metal oxides; tricyclohexylphosphine, tricyclopentylphosphine, tri-n-hexylphosphine, tris (2,4,4-trimethylpentyl) phosphine, tris (2-ethylhexyl) phosphine, tri-n-octylphosphine, tri-n-decylphosphine, tri-n-dodecylphosphine, tristearylphosphine, triphenylphosphine; and catalysts in the form of mixtures of an epoxide with one or more tertiary amines, it being possible for salts of strong bases or small amounts of the strong bases themselves additionally to be added;

or a mixture of two or more of the mentioned catalysts.

10. The method according to claim 1, wherein the hybrid system is used in the form of two-component kit, wherein (i) constituents a) and b) are present in one component, while constituent c) is present together with a catalyst in a different component which is not capable of mixing in a stored state, it being optionally possible in each case for one or more further ingredients to be present; or
(ii) constituents a), b) and an epoxy moiety of an epoxy/tert-amine catalyst are present in one component, and constituent c) is present together with a tert-amine moiety of an epoxy/tert-amine catalyst in a different component, it being optionally possible in each case for one or more further additional ingredients to be present.

11. The method according to claim 10, wherein, in the hybrid system, the reaction constituent a) is a reaction resin comprising or consisting of an $\alpha,\beta$-unsaturated compound that carries at least one fumarate, maleate, itaconate or acrylate group or two or more thereof.

12. The method according to claim 10, wherein the constituent a) is selected from the group consisting of hydroxy-C2-C10alkyl-acrylate, ethanediol diacrylate, 1,3-propanediol diacrylate, 1,4-butanediol acrylate, poly (butanediol) diacrylate, polybutadiene diacrylate, 3-methyl-1, 5-pentanediol-diacrylate, 1,6-hexanediol diacrylate, diethyleneglycol diacrylate, tetraethyleneglycol diacrylate, tripropyleneglycol diacrylate, triethyleneglycol diacrylate, triisopropyleneglycol diacrylate, dipropyleneglycol diacrylate, neopentylglycol diacrylate, ethoxylated or propoxylated neopentylglycol diacrylate, tripropyleneglycol diacrylate, bisphenol-A-, bisphenol-F-, bisphenol-AF-or bisphenol-S-diglycidyl ether diacrylate, bisphenol-A-polyethoxydiacrylates, bisphenol-F-polyethoxydiacrylates, polyethyleneglycol diacrylates, polypropyleneglycol diacrylates, trimethylolpropane triacrylate, di-trimethylolpropane tetraacrylate, trimethylolpropane polyethoxytriacrylate, ethoxylated or propoxylated trimethylolpropane triacrylate, glycerol triacrylate, ethoxylated or propoxylated glycerol triacrylate, tris (2-acryloxyethyl) isocyanurate, pentaerythritol triacrylate, pentaerythritol monohydroxytriacrylate, pentaerythritol triethoxytriacrylate, pentaerythritol tetraacrylate, ethoxylated or propoxylated pentaerythritol tetraacrylate, ditrimethylolpropane tetraacrylate, dipentaerythritol pentaacrylate, dipentaerythritol polyhexanolide hexaacrylate, dipentaerythritol hexaacrylate, tris (hydroxyethyl) isocyanuratopolyhexanolide triacrylate, tris (2-hydroxyethyl)isocyanuratotriacrylate, tricyclodecanedimethylol diacrylate, esterdiol diacrylate, 2-(2-acryloyloxy-1, 1-dimethyl)-5-ethyl-5-acryloyloxymethyl-1,3-dioxane, tetrabromobisphenol-A-diethoxydiacrylate, 4,4-dimercaptodiphenylsulfide diacrylate, polytetraethyleneglycol diacrylate, 1,9-nonanediol diacrylate, 1, 10-decanediol diacrylate, dimethylolpropane tetraacrylate, cresol epoxyacrylates, novolak "poly" acrylate, acrylate-group-containing oligomers or polymers from the reaction of polyepoxides with acrylic acid or reactive derivatives which are acid halides or active esters or from the reaction of polyester polyols with acrylic acid or reactive derivatives thereof as just mentioned, urethane acrylates obtainable by reaction of isocyanates with an OH-group-containing acrylate selected from the group consisting of hydroxyethyl-, hydroxypropyl-, hydroxybutyl-or pentaerythritol-tri-acrylate, and tetrafunctional polyester acrylates); an acrylic-functional alkoxysilane or organopolysiloxane selected from the group consisting of acrylatomethyl-trimethoxysilane,-methyldimethoxysilane,-dimethylmethoxysilane,-triethoxysilane or-methyldiethoxysilane, acrylamidomethyl-trimethoxysilane,-methyldimethoxysilane, -dimethylmethoxysilane,-triethoxysilane, or-methyldiethoxysilane, -methyl-dimethylethoxysilane; a polyester resin based on maleic, fumaric or itaconic acid or a respective anhydride thereof;

a polyester, polyurethane, polyether and/or alkyd resin that carries activated, ethylenically unsaturated groups;

and an $\alpha,\beta$-unsaturated compound having biogenic content having biogenic acrylate content of hydroxy-group-containing vegetable oils, selected from the group consisting of castor oil or soybean oil, a wholly or at least partly biogenic C1-C10) alkan (mono-, di-, tri-, tetra-, penta-or hexa-or poly-) ol acrylate, a partly or wholly biogenic polyglycerol acrylate, a wholly or partly biogenic acrylate of one or more sugar alcohols selected from the group consisting of mannitol, xylitol and sorbitol, a wholly or partly biogenic acrylated fusel oil, a wholly or partly biogenic 5-or 6-membered-ring heterocyclyl acrylate having one or two hetero atoms selected from O, N and S in the ring, or a partly or wholly biogenic glycerol or polyglycerol acrylate, and a wholly or partly biogenic saccharide acrylate; or the corresponding methacrylates;

or a mixture of two or more of the mentioned $\alpha,\beta$-unsaturated compounds.

13. The method according to claim 1, wherein, in the hybrid system, the reaction resin based on compounds that include one or more CH-acidic methylene groups is one comprising malonic acid or a malonic acid ester, cyanoacetic acid esters, an acetoacetate-group-carrying oligomer or polymer which is obtainable, by transesterification of acetoacetic acid esters, an acetoacetate-group-carrying oligomer or polymer which is obtainable by copolymerisation of acetoacetoxyethyl methacrylate, an oligomer or polymer which is obtainable from dialkyl malonates and diols, or an acetoacetylated novolak, or a mixture of two or more thereof.

14. The method according to claim 13, wherein, in the hybrid system, the reaction resin based on compounds that include one or more CH-acidic methylene groups is malonic acid dimethyl ester, malonic acid diethyl ester, malonic acid di-n-propyl ester, malonic acid diisopropyl ester, malonic acid dibutyl ester, malonic acid di-(2-ethylhexyl) ester, malonic acid dilauryl ester, 2-ethylhexyl cyanoacetate, butyl cyanoacetate, octyl cyanoacetate, 2-methoxyethyl cyanoacetate, pentane-2,4-dione, hexane-2,4-dione, heptane-2,4-dione, 1-methoxy-2,4-pentanedione, 1-phenyl-1,3-butanedione, 1,3-diphenyl-1,3-propanedione, 4,6-dioxoheptanoic acid methyl ester, 5,7-dioxooctanoic acid methyl ester, benzoylacetoacetic acid methyl, ethyl or butyl ester, propionylacetic acid methyl, ethyl or butyl ester, butyroylacetic acid methyl ester, acetoacetic acid methyl, ethyl, isopropyl, n-butyl, isobutyl or tert-butyl ester, acetoacetic acid (2-methoxyethyl) ester, acetoacetic acid (2-ethylhexyl) ester, acetoacetic acid lauryl ester, 2-acetoacetatoethyl acrylate, acetoacetic acid benzyl ester, 1,4-butanediol diacetoacetate, 1,6-hexanediol diacetoacetate, neopentyl glycol diacetoacetate, 2-ethyl-2-butyl-1,3-propanediol diacetoacetate, cyclohexanedimethanol diacetoacetate, free or ethoxylated bisphenol-A-,-F-,-AF-or-S-diacetoacetate, trimethylolpropane triacetoacetate, pentaerythritol tri-or tetraacetoacetate, ditrimethylolpropane tetraacetoacetate, dipentaerythritol hexaacetoacetate, an acetoacetate-group-carrying oligomer or polymer which is obtained by transesterification of acetoacetic acid ethyl esters, an acetoacetate-group-carrying oligomer or polymer obtained by copolymerisation of acetoacetoxyethyl methacrylate, an oligomer or polymer obtained from dialkyl malonates and dials, or an acetoacetylated novolak, or a mixture of two or more thereof.

15. The method according to claim 1, wherein, in the hybrid system, the primary amine is a primary di-or polyamine which contains aliphatic, heteroaliphatic, alicyclic, heterocyclic, aromatic, aliphatic-aromatic and silane/siloxane molecular structures or two or more selected independently therefrom, including aminoamides, polyaminoamides, Mannich bases and amine adducts, isocyanate-amine adducts, Bucherer adducts or Michael addition adducts;

or a mixture of two or more of the mentioned (poly) amines.

16. The method according to claim 15, wherein, in the hybrid system, the primary amine is a primary di-or polyamine selected from the group consisting of 1,2-diaminoethane, 2-methylpentanediamine, 2,2-dimethyl-1,3-propanediamine, 2,2,4-or 2,4,4-trimethylhexamethylenediamine, 1,13-diamino-4, 7, 10-trioxatridecane, commercially available amine-functionalised polyoxyalkylenes, triethylenetetramine, isophoronediamine, 1,3-and/or 1,4-bisaminomethylcyclohexane, TCD-diamine, 1,2-or 1,4-diaminocyclohexane, bis (4-aminocyclohexyl) methane, bis (4-amino-3-methylcyclohexyl) methane, norbornanediamine, diaminodicyclohexylmethane, 2,2-bis(4-aminocyclohexyl) propane, aminoethylpiperazine, 1,3-or 1,4-benzenedimethanamine, 1-amino-3-aminomethyl-3,5,5-trimethylcyclohexane, 1,3-benzenedimethanamine, 1,4-benzenedimethanamine, 1,6-diamino-2,2,4-trimethylhexane, triethylenetetramine, tetraethylenepentamine, pentaethylenehexamine, N-aminoethylpiperazine, 1,3-bis (aminomethyl) cyclohexane, TCD-diamine, Jeffamines, dipropylenetriamine, N,N'-dicyclohexyl-1,6-hexanediamine, N,N'-dimethyl-1,3-diaminopropane, N,N'-diethyl-1,3-diaminopropane, N,N-dimethyl-1,3-diaminopropane, secondary polyoxypropylene-di-and-tri-amines, 2,5-diamino-2,5-dimethylhexane, bis (aminomethyl) tricyclopentadiene, 1,8-diamino-p-menthane and bis (4-amino-3, 5-dimethylcyclohexyl)methane, an aminoalkylsilane that includes at least one hydrolysable alkoxy group selected from the group consisting of one or more of the following compounds: 3-aminopropyl-trimethoxysilane, 3-aminopropyltriethoxysilane, 3-aminopropylmethyldiethoxysilane, 3-aminopropylethyldiethoxysilane, 3-aminopropylphenyldiethoxysilane, 4-aminobutyltriethoxysilane, 4-aminobutylethyl-diethoxysilane, N-(2-aminoethyl)-3-am inopropyltrimethoxysilane and N-(2-aminoethyl)-3-aminopropylmethyldimethoxysilane; or a copolymer of one of the above-mentioned silanes or a different silane;

or a mixture of two or more of the mentioned (poly) amines.

17. The method according to claim 1, comprising introducing the anchoring means and the hybrid system in drilled holes.

18. The method according to claim 1, wherein the hybrid system is in the form of a two-component system.

19. The method according to claim 1, wherein the hybrid system includes one or more further additives, selected from the group consisting of fillers, rheology aids, thixotropic agents, plasticisers, colouring additives, adhesion promoters, solvents and reactive diluents.

\* \* \* \* \*